June 7, 1938.  F. W. DUNMORE  2,119,530
COURSE INDICATOR FOR BLIND FLYING AND LANDING
Filed Nov. 10, 1932
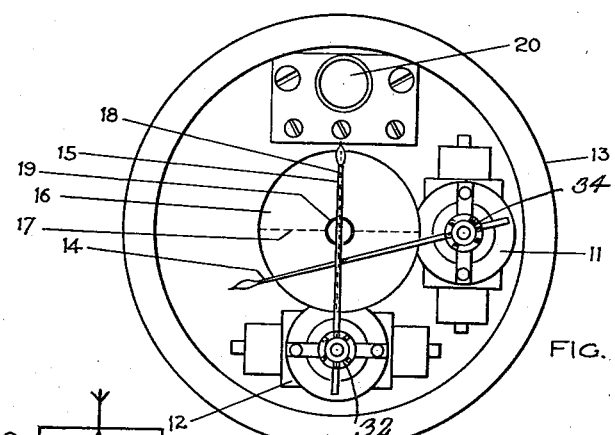
FIG. 1.
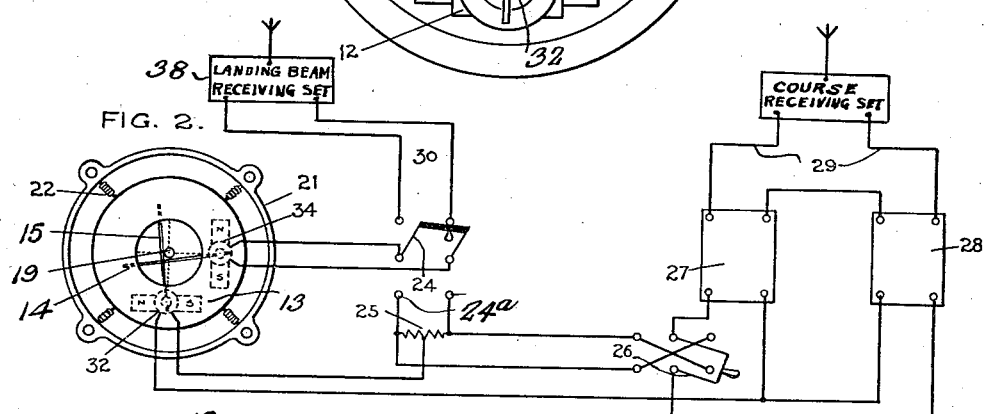
FIG. 2.
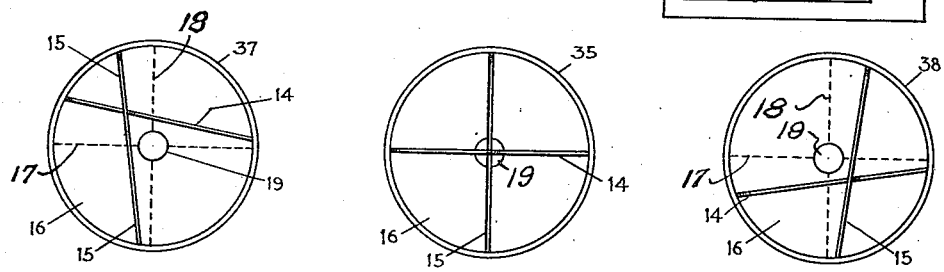
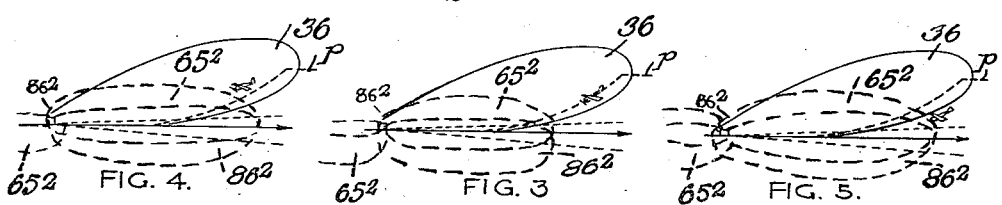
FIG. 4.   FIG. 3.   FIG. 5.
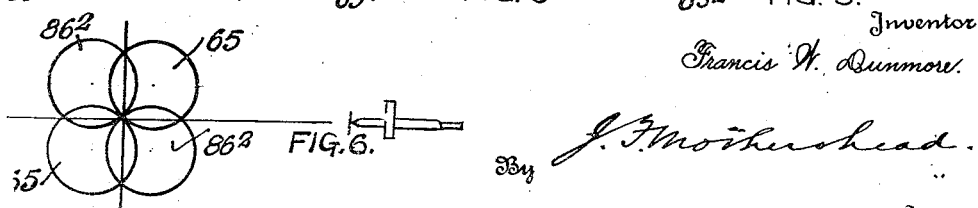
FIG. 6.
Inventor
Francis W. Dunmore.
By J. T. Motherhead.
Attorney Patented June 7, 1938

2,119,530

UNITED STATES PATENT OFFICE 2,119,530

COURSE INDICATOR FOR BLIND FLYING AND LANDING

Francis W. Dunmore, Washington, D. C., assignor to the Government of the United States, represented by the Secretary of Commerce Application November 10, 1932, Serial No. 642,045

8 Claims. (Cl. 177—352)

(Granted under the act of March 3, 1883, as amended April 30, 1928; 370 O. G. 757)

The invention described herein may be manufactured and used by or for the United States for governmental purposes only without the payment of any royalty thereon.

My invention relates to an indicating instrument which gives both radio beacon course indication and received signal volume indication on the same instrument; or radio beacon course indication and landing beam path indication on the same instrument.

This invention is an improvement on my previous inventions in which these two indications were given by two separated and distinct instruments and is particularly useful in connection with the system shown in my copending application, Ser. No. 627,625.

In this invention two pointer driving units are mounted in one case so that the pointers of these two units may be seen on the one instrument face. These units are so arranged that the pointers move at right angles to each other. The advantages of this instrument are light weight, less space required and indications given at one spot eliminating the necessity for the navigator to glance at several different points on his instrument board. Other uses for and advantages of my invention will be more clearly understood by reference to the following description and diagrammatic drawing.

In the drawing:—

Figure 1 is a view of one form of my invention, with a face plate forming a portion of its casing removed to show normally concealed parts.

Figure 2 represents this form of my invention and electric circuits suitable for use therewith.

Figure 3 shows the correct position of the two pointers when an airplane is on a correct landing path and beacon course as indicated in the accompanying diagram.

Figure 4 shows approximate positions of my pointers when an airplane equipped with my invention is above the correct landing path and to the left of the correct runway or beacon course as indicated in the accompanying diagram.

Figure 5 shows approximate positions of my pointers when the airplane is below the correct landing path and to the right of the desired course, as indicated by the accompanying diagram.

Figure 6 is a diagrammatic view of a 4-course radio beacon used in conjunction with the landing beam 36 for giving lateral guidance to port, or runway thereof.

Figure 1 represents one form of my invention in which the two electrical instrument pointer driving units 11 and 12 are mounted at right angles to each other in a case 13. Driving unit 11 operates the end zero pointer 14 and driving unit 12 operates the center zero pointer 15. Such devices are well known in the art and are ordinarily provided with yieldable means for returning the pointers to their normal positions. These pointers both move over face or dial 16 which may have reference lines 17 for pointer 14 and reference line 18 for pointer 15. A circle or index mark 19 may be placed at the intersections of lines 17 and 18 as an additional reference point. 20 is a small electric light. With the instrument cover in place just the face 16 and pointers 14 and 15 are visible to the navigator. The pointers 14 and 15 are mounted and arranged to move in parallel planes, preferably at right angles to each other and to intersect in all of their positions, the point of intersection indicating (when the instrument is operated by both lateral and vertical signals) the relative course and position of the aircraft with respect to that occupied, when it is following a correct course, which is indicated when said pointers cross at right angles or at the index mark 19.

Figure 2 represents an application of this combined instrument in one form of circuit. In this figure the instrument described in Figure 1, is here shown mounted in an annular support 21 cushioned on springs 22. The driving coil 34 for a pointer 14 of the unit 11, is connected to the center terminals of a double-pole double-throw switch 24. A resistance 25 is connected across the lower terminals of this switch. A reversing or course selector switch 26 is also connected across resistor 25. 27 and 28 are reed converter units the inputs of which are connected through conductors 29 to the radio beacon receiving set 37, responsive to the radio beacon course signals indicated in Fig. 6. The upper terminals of switch 24 are connected to the output of the landing beam receiving set 38 or other type of fog landing receiving set through conductors 30 responsive to the landing beam 36. The method and apparatus for producing the radio beacon course and the landing beam are fully defined in the Bureau of Standards Research, vol. 5 of October 1930, Paper #238, Pts. III and IV. The driving coil for pointer 23 is connected to the center point of resistor 25 and to a terminal of the rectifier in converter 27 and to the terminal of opposite polarity of the rectifier in converter 28. With switch 24 thrown down in contact with terminals 24ᵃ combined instrument 21 serves to give double modulation beacon course indications by means of pointer 15 which normally intersects the circle 31 or index mark 19 when there is no current in the coils 32 of a unit 12, and pointer 14 serves to give signal volume indication as both converters 27 and 28 cause a $RI^2$ drop of the same polarity across resistor 25. With no current in the driving coils of unit 11 the position of the pointer is as shown at 14, Figure 1. When on the beacon course and with correct received signal level the two pointers 14 and 15 intersect at the circle 19.

With switch 24 thrown up in contact with terminals 24b the output of the fog landing receiving set is connected to the driving coil of unit 11 and picks up the beam signal 36. Pointer 33 then serves to give indications as to the position of the plane with respect to the proper landing path $p$ in the vertical plane while pointer 23 continues to give indications from the field or runway beacon signal (shown in Fig. 6 and in dotted lines in Figs. 3, 4, and 5) of the proper course in the horizontal plane.

Figure 3 at 35 shows the position of the two pointers when the plane is on the correct horizontal and vertical landing path of the beacons 36. 37 (Fig. 4) shows the pointer indications when the airplane is above the proper vertical landing path and off to the left of the runway, while the indication at 38 (Fig. 5) shows the plane too low and off to the right. To land a plane, the pilot merely holds the intersection of the two pointers over the central circle.

Driving unit 11, Figure 1, may be a 0–500 microameter and driving unit 12 a 200–0–200 microameter.

While the above is one form of my invention, the driving units 11 and 12 may be of any convenient type and connected to any form of course indicating receiving apparatus which may indicate vertical and horizontal guidance.

What I claim is:

1. On an aircraft, a radio azimuth and zenith indicator comprising a face plate with a horizontal and a vertical line intersecting at right angles, a pointer indicating degrees of azimuth moving in front of said face plate in a plane parallel to it and coinciding with said vertical line when in midscale position, a second pointer indicating degrees of zenith moving in front of said face plate in a plane parallel to it and coinciding with said horizontal line when in midscale position and always intersecting said first pointer, the point of intersection indicating the azimuthal and zenithal position of said aircraft.

2. On an aircraft, a radio course indicator having a dial with an index point indicating a predetermined course, and further having two movable intersecting pointers positioned to cooperate with said index point to show an on-course position of the aircraft, and signal responsive means for moving one of said pointers relatively to said index point in the same direction on the dial as the deviation of said aircraft from the predetermined course in a horizontal plane, and for moving said other pointer relatively to said index point in the same direction on the dial as the deviation of said aircraft from the predetermined course in a vertical plane, said movable pointers being arranged to intersect on said dial at all times during their movement to indicate the position of the aircraft with respect to said index point indication of predetermined course on the dial.

3. On an aircraft, a radio course indicator having a point of predetermined course indication, two movable intersecting pointers arranged to intersect at all times, signal responsive means for operating said pointers to cause the latter to intersect opposite said point of predetermined course when said aircraft is on a predetermined course and to intersect at a point relative to said point of predetermined course in the same direction as the deviation of said aircraft from said predetermined course.

4. In an electrical indicating instrument the combination of two pointers arranged to move in parallel planes and to intersect each other in all their indicating positions when operating, means for operating said pointers to move relatively to each other, a dial mounted for reading with the pointers and having an index mark at which said pointers may intersect in one of their operating positions, yielding means tending to normally hold one pointer at said index mark, and a second yielding means tending to normally hold the other pointer away from said index mark, said pointers being positioned so that one indicates a substantially vertical position and the other indicates a substantially horizontal position when intersecting at said index mark.

5. The combination of an electrical indicating instrument having two magnetic fields, a revolubly mounted coil in one of said magnetic fields, a pointer attached to said coil at right angles to the axis of rotation of said coil, a second revolubly mounted coil in the second of said magnetic fields with its axis of rotation parallel to said first axis of rotation, a second pointer attached to said second coil, and extending to move in a plane parallel to that of and to intersect at all times with said first pointer, a dial having a scale mounted for reading with intersection of said pointers and in a plane perpendicular to the axis of rotation of said coils, said dial having an index mark at its center at which the pointers intersect in one of their positions, yielding means attached to said first pointer and tending to hold the latter at said center index mark, a second yielding means attached to said second pointer and tending to hold the latter away from said index mark.

6. In a device for giving azimuthal and zenithal indications and azimuthal and intensity indication, a visual indicator having indication observation area, two intersecting pointers mounted to traverse respectively the area before said opening, one of said pointers being an end zero pointer and the other a center zero pointer, electrically operated means on the indicator for operating each pointer, two sources of direct current potential, means connecting in opposition said two sources to the operating means of the zero center pointer, third source of direct current potential for controlling the zenithal indication, and means for connecting at will said end zero pointer operating means either to said third source or to said first and second sources in aiding polarity, whereby the end zero pointers will give zenithal indications from the third source, or intensity indications from said first and second sources with the center zero pointer giving azimuthal indications from said first and second sources.

7. An instrument for visibly indicating azimuthal and zenithal movement of a mobile object with respect to a determined path of movement, said instrument comprising an area on which said visible indications may be observed, two pointers arranged to intersect at all times before said area when operating, one of the intersecting positions denoting a determined path of movement of the object, one of said pointers being disposed with respect to said area to indicate in an azimuthal direction with the azimuthal movement of said movable object, the other of said pointers being disposed with respect to said area to indicate in a zenithal direction with respect to the zenithal movement of said mobile object, the point of intersection of said pointers indicating the position of the movable object with respect to said determined path of movement, and means for operating said pointers according to the movement of said object.

8. The combination with an indicating instrument having a pointer normally resting at one end of its range of movement, of a second pointer normally standing at zero center of its range of movement, said pointers being arranged to intersect at all times and to intersect each other at right angles when in their mid-scale positions with said first pointer indicating a substantially horizontal position and said second pointer indicating a substantially vertical position, and signal responsive means for operating said pointers.

FRANCIS W. DUNMORE.